United States Patent [19]

Finch et al.

[11] 3,843,713

[45] Oct. 22, 1974

[54] 16-LOWER ALKOXY LOWER ALKYL,-16–20 W-PENTANO, PGE

[75] Inventors: Neville Finch, West Orange; Isidoros Vlattas, Summit, both of N.J.

[73] Assignee: CIBA-GEIGY Corporation, Ardsley, N.Y.

[22] Filed: Dec. 1, 1972

[21] Appl. No.: 311,053

Related U.S. Application Data

[63] Continuation-in-part of Ser. No. 241,423, April 5, 1972, Pat. No. 3,798,275.

[52] U.S. Cl....... 260/468 D, 260/326 S, 260/340.3, 260/340.5, 260/345.8, 260/468 J, 260/470, 260/471 A, 260/511 D, 260/516, 260/518 R, 260/566 AE, 260/609 R, 424/305, 424/317

[51] Int. Cl...................... C07c 69/74, C07c 69/36

[58] Field of Search...... 260/468 D, 914 D, 914 UA

[56]       References Cited
              OTHER PUBLICATIONS

Fried et al., JACS 93 5594 (1971).

*Primary Examiner*—Robert Gerstl
*Attorney, Agent, or Firm*—John J. Maitner; Joseph G. Kolodny

[57]           ABSTRACT

16 lower alkoxy lower alkyl -16-20 ω penta-nor PGE, has been prepared thereof.

3 Claims, No Drawings

16-LOWER ALKOXY LOWER ALKYL,-16–20 W-PENTANO, PGE

CROSS-REFERENCES TO RELATED APPLICATIONS

This is a continuation-in-part of application Ser. No. 241,423, filed Apr. 5, 1972 now U.S. Pat. No. 3798275.

BACKGROUND OF THE INVENTION

It is known that β-hydroxy-ketones are labile products, prone to dehydration. This holds true for the prostaglandins (PG) of the $E_1$, $E_2$ and $E_3$ series, which easily dehydrate to the corresponding products of the A and B series, known to be biologically differently acting or much less active than the former.

Therefore, special protecting groups have been devised for the oxo group therein, as well as in precursors of these products, which prevent dehydration during synthetic manipulation, but allow the final regeneration of the desired β-hydroxyketone or any product obtainable therefrom.

Surprisingly, we have found new etherfied mercaptomethoxyamines, which are sufficiently stable to handle and are extremely useful for said oxo-protecting purposes. Although said mercaptomethoxyamines contain two heteroatoms attached to a single, non-functionalized carbon atom and, therefore, would seem to be unstable, they turned out to be rather stable, sometimes even distillable hydroxylamine derivatives. They readily form oximes with either aldehydes or ketones, which are also rather stable in basic or moderately acidic media. They are cleaved, according to our new process, with mercuric salts in various media, to yield either the free oxo-compound directly, or the correspondingly etherified or esterified O-hydroxymethyloxime. The latter can either be hydrolyzed to the free oxime, or the aldehyde or ketone respectively, which latter step is illustrated in co-inventor's U.S. Pat. No. 3,532,721.

SUMMARY OF THE INVENTION

The present invention concerns and has for its object the provision of new etherified mercaptomethoxyamine compounds, more particularly of those corresponding to Formula I

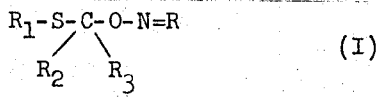

(I)

wherein R represents two hydrogen atoms or a 9-desoxo-prostaglandin moiety or equivalent analog thereof, each of $R_1$, $R_2$ and $R_3$ are identical or different lower aliphatic, cycloaliphatic, araliphatic or aromatic radicals, or $R_2$ and $R_3$ are hydrogen or lower alkylene, of methods for the preparation thereof, as well as of the new process which consists in reacting a compound of Formula I, wherein R is different from hydrogen, with a mercuric salt in an aqueous, alcoholic or acidic medium, hydrolyzing any resulting ether or ester of the formally drawn hemiacetal of Formula II

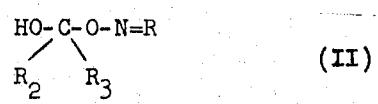

(II)

in a more acidic or a basic medium and the presence or absence of a hydroxylamine acceptor, to yield R = O or the oxime thereof.

DESCRIPTION OF THE PREFERRED EMBODIMENTS

The 9-desoxo-PGE moiety R, or the equivalent analog thereof, is preferably that of Formula III

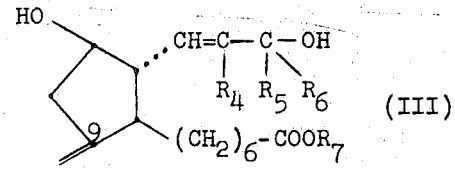

(III)

wherein each of $R_4$ and $R_5$ is hydrogen or lower alkyl, $R_6$ is a lower aliphatic or cycloaliphatic radical and $R_7$ is hydrogen, one metal equivalent or a lower aliphatic, cycloaliphatic, araliphatic or aromatic radical. The term "lower" referred to above and hereinafter in connection with organic radicals or compounds respectively, defines such with up to 7, preferably up to 4, carbon atoms.

Accordingly, a lower aliphatic radical $R_1$, $R_2$, $R_3$, $R_6$ and $R_7$ represents preferably lower alkyl, e.g., methyl, ethyl, n- or i-propyl, -butyl, -pentyl, -hexyl or -heptyl; lower alkenyl, e.g., allyl or methallyl; or lower alkynyl, e.g., ethynyl or propargyl. Said lower cycloaliphatic radicals are preferably 3 to 7 ringmembered cycloalkyl, cycloalkenyl or (cycloalkyl or cycloalkenyl)-lower alkyl groups, e.g. cyclopropyl, cyclobutyl, cyclopentyl or cyclohexyl; cyclopent-1-enyl or cyclohex-1 or 3-enyl; cyclopropylmethyl, cyclobutylmethyl, 1- or 2-cyclopentylethyl; cyclopent-3-enylmethyl or cyclohex-1-enylmethyl. Said araliphatic or aromatic radicals are preferably isocyclic, monocyclic radicals, such as phenyl-lower alkyl or phenyl groups, unsubstituted or substituted in the aromatic ring by one or more than one, especially one or two, of the same or different substituents, such as lower alkyl, e.g., methyl, ethyl, n- or i-propyl or -butyl, lower alkoxy, e.g., methoxy, ethoxy, n- or i-propoxy or -butoxy, lower alkylenedioxy, e.g., methylenedioxy, 1,1- or 1,2-ethylenedioxy, halogeno, e.g., fluoro, chloro, bromo or iodo, trifluoromethyl, nitro or amino, such as di-lower alkylamino, e.g., dimethylamino or diethylamino. Said aliphatic radicals, especially lower alkyl groups $R_6$, can also be substituted by one of said lower alkoxy groups or one or up to the maximum number of halogen atoms, as is the case in trifluoromethyl, 2-(methoxy, ethoxy, chloro, bromo or iodo)-ethyl, -propyl or -butyl, 2,2-dichloro-ethyl, -propyl or -butyl, 3,3,3-trichloroethyl, 3-(methoxy, ethoxy, chloro or bromo)-propyl or -butyl, 4-(methoxy or chloro)-butyl. A lower alkylene group $R_2 + R_3$ is preferably ethylene, 1,2- or 1,3-propylene, 1,2-, 1,3-, 1,4- or 2,3-butylene or 1,2-, 1,3-, 1,4-, 1,5-, 2,3- or 2,4-pentylene.

Preferred compounds of the invention are those of Formula I, in which R represents two hydrogen atoms or the radical of Formula III, each of $R_1$, $R_6$ and $R_7$ is lower alkyl, lower alkenyl, lower alkynyl, 3 to 7 ring-membered cycloalkyl, cycloalkenyl or (cycloalkyl or cycloalkenyl)-lower alkyl, each of $R_1$ and $R_7$ are also Ph-$C_nH_{2n}$, wherein Ph is phenyl, (lower alkyl)-phenyl, (lower alkoxy)-phenyl, (lower alkylenedioxy)-phenyl, (halogeno)-phenyl, (trifluoromethyl)-phenyl, (nitro)-phenyl or (di-lower alkylamino)-phenyl, and n is an integer from 0 to 4, $R_6$ is also (lower alkoxy or halo)-lower alkyl and $R_7$ also hydrogen, an alkali metal atom or one equivalent of an alkaline earth metal, each of $R_2$, $R_3$, $R_4$ and $R_5$ are hydrogen or lower alkyl, or $R_2$ is Ph, or $R_2 + R_3$ are lower alkylene.

More preferred are those compounds of Formula I, wherein R represents two hydrogen atoms or the radical of Formula III, $R_1$ is $C_mH_{2m+1}$ or $Ph-C_nH_{2n}$ wherein m is an integer from 1 to 4, Ph is phenyl, tolyl, anisyl, fluorophenyl or chlorophenyl, n is an integer from 0 to 2, each of $R_2$, $R_3$, $R_4$ and $R_5$ are hydrogen or lower alkyl, or $R_2 + R_3$ are ethylene, 1,2- or 1,3-propylene, $R_6$ is lower alkyl, lower alkoxylakyl or perfluoro-lower alkyl and $R_7$ is hydrogen, sodium, potassium or lower alkyl; advantageously $R_5 + R_6$ contain at least 4 carbon atoms.

Especially valuable are compounds of Formula I, wherein R represents two hydrogen atoms or the radical of Formula III, $R_1$ is methyl, benzyl, α-phenethyl or phenyl, each of $R_2$, $R_3$, $R_4$ and $R_5$ is hydrogen or methyl or $R_2 + R_3$ are ethylene or 1,3-butylene, $R_6$ is t-butyl, n-pentyl, 2-ethoxyethyl or trifluoromethyl and $R_7$ is hydrogen, sodium, potassium or alkyl with up to 4 carbon atoms.

The compounds of Formula I, wherein R represents two hydrogen atoms and the other symbols have the meaning given above, are prepared according to the following formula scheme:

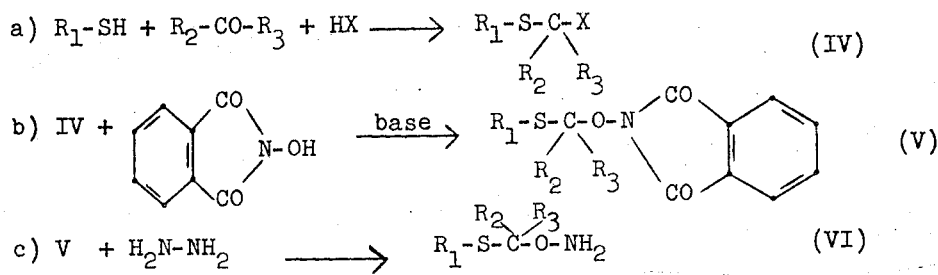

d. VI + R'=O → → I (R' is precursor of R and not $H_2$) wherein X is a halogen atom, preferably chloro. The base used in the second step b) is preferably a tertiary nitrogen base, such as a tri-lower alkylamine, e.g., triethylamine, or an azacyclic aromatic base, e.g., pyridine or collidine, and the hydrazine used is preferably a hydrate, e.g., the monohydrate, thereof.

The process according to the present invention can be depicted as follows:

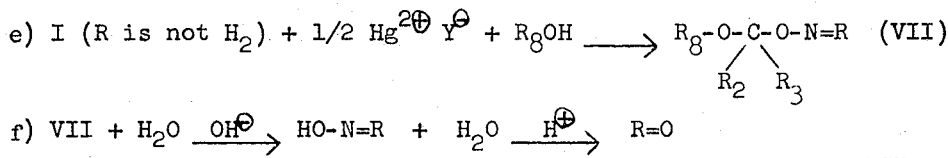

wherein $Y^⊖$ is one anion equivalent of an inorganic or organic acid, preferably that of a mineral acid, such as a hydrohalic acid, e.g., hydrochloric or hydrobromic acid; sulfuric or perchloric acid; or an aliphatic, araliphatic or aromatic carboxylic or sulfonic acid, such as a lower alkanoic or aralkanoic acid, e.g., acetic, propionic, benzoic or phenylacetic acid, or a lower alkane or benzenesulfonic acid, e.g., methane, ethane, benzene or p-toluenesulfonic acid, and $R_8$ is hydrogen, lower alkyl or the acyl radical or a carboxylic acid, e.g., such mentioned above, preferably lower alkanoyl, e.g., formyl, acetyl or propionyl. The processes according to item d) are analogously carried out as described in U.S Pat. No. 3,532,721, but using compounds of Formula VI instead of the 2-substituted ethoxy-amines described therein.

Accordingly, the reaction according to the invention can be carried out either stepwise or, in case $R_8$ is hydrogen, in a single step, leaving the compounds of Formula VII as a shortliving intermediate in the reaction mixture. In case $R_8$ is different from hydrogen, said compounds can be isolated from moderately acidic media, especially for purification purposes. They can be hydrolyzed either to the oxime R=N—OH or the oxo compound R=O, depending on the pH of the aqueous medium chosen. At values over 7, for example in the presence of alkali metal hydroxides, carbonates or bicarbonates, or the above-mentioned nitrogen bases, said oxime is obtained, whereas at values under 7, such as in mildly acidic aqueous solutions down to pH=2 of the above-mentioned acids, preferably in the presence of a hydroxylamine acceptor, such as formaldehyde, acetone, levulinic or nitrous acid, the oxo compound R=O is liberated.

The above reaction steps are carried out according to standard methods, in the presence or absence of dilu-ents, preferably such as are inert to reagents and are solvents thereof, of catalysts, condensing, neutralizing or buffering agents and/or inert atmospheres, at low temperatures, room temperature or elevated temperatures, e.g., the boiling point of the diluents used, at atmospheric, superatmospheric or reduced pressure.

Thus, for example, step a) can be carried out in the absence of a diluent, as long as the reactants are liquids. Otherwise steps a) as well as b) and c) are advantageously carried out in polar diluents, preferably ethers for a) and b) e.g., diethyl ether or tetrahydrofuran, and alcohols, such as lower alkanols for c). Step d) is advantageously carried out with acid addition salts of VI, such as those derived from inorganic or organic acids, e.g., those mentioned for $Y^⊖$, in a liquid base or neutralizing agent respectively, such as the nitrogen bases mentioned above. The media in steps e) and f) have already been mentioned; for solubility purposes, however, the presence of lower alkanols, e.g., methanol, ethanol, n- or i-propanol, is advantageous.

The compounds of the invention, including any new ketones R=O, so obtained and are mixtures of isomers, can be separated into single isomers by methods in themselves known. For example, stereomers can be separated by virtue of the physicochemical differences between the components, for example, by chromatography and/or fractional crystallization. Also racemic products, e.g., R=O, are resolved into optical antipodes in the usual manner, or according to the present invention by reacting it with a compound of Formula VI, containing a center of asymmetry, separating the diastereomers obtained according to the above separation methods, and liberating the optically active products according to the process mentioned under items e) and f).

The new ketones R=O, wherein R is that of Formula III, in which $R_4$, $R_5$ and $R_7$ have the meaning given above, and $R_6$ is tertiary lower alkyl, preferably t-butyl, lower alkoxyalkyl, preferably 2-ethoxyethyl, or halogeno-lower alkyl, such as perfluorolower alkyl, preferably trichloromethyl, are new and also considered part of this invention. Said compounds are prostaglandin-like smooth muscle contracting, hypotensive and luteolytic agents, useful in the dosage range known for the natural prostaglandins, for example, in the treatment or management of hypertension, asthma, and fertility. They are also valuable intermediates of other preparations, preferably of pharmacologically useful products.

The starting material used is known [e.g., U.S. pat. No. 3,532,721 or H. Bohme et al., Ann. 563, 54 (1949)] or can be prepared according to the methods illustrated in the examples therein.

The following examples illustrate the invention, and are not to be construed as being limitations thereon. If not otherwise stated, all evaporations are carried out under reduced pressure. Temperatures are given in degrees Centigrade and the N.M.R. spectra are obtained from about 10 percent solutions in deuterochloroform at 60 Mc/s with $Si(CH_3)_4$ as zero.

EXAMPLE 1

To the mixture of 31.7 g of chloromethyl-methylsulfide, 45.1 g of N-hydroxyphthalimide and 500 ml. of tetrahydrofuran, the solution of 45 ml of triethylamine in 90 ml of tetrahydrofuran is added dropwise and the mixture refluxed for 48 hours. It is filtered, the filtrate evaporated and the residue taken up in methylene chloride. The solution is washed 4 times with 10 percent aqueous potassium bicarbonate, dried, evaporated and the residue crystallized from diethyl ether, to yield the N-methylmercaptomethoxy-phthalimide, melting at 94°–95°.

The mixture of 40 g thereof, 9.42 g of hydrazine hydrate, 9.2 ml of water and 350 ml of 95 percent aqueous ethanol is refluxed for 4 hours and allowed to cool to room temperature. It is filtered, the filtrate evaporated and the residue taken up in the minimum amount of diethyl ether. The solution is allowed to stand at 0° overnight, filtered, the filtrate evaporated, the residue distilled and the fraction boiling at 54°–55°/15 mm Hg collected, to yield the methylmercaptomethoxyamine of the formula

It is dissolved in the minimum amount of diethyl ether and the solution combined with ethereal hydrogen chloride until no further precipitate is formed. The mixture is filtered and the residue recrystallized from methanol-diethyl ether, to yield the methylmercaptomethoxyammonium chloride, melting at 149°–151° with decomposition.

The mixture of 1.7 g thereof, 3.2 g of 2α-(6-methoxycarbonyl-hexyl)-3-oxo-5α-trimethylsiloxy-cyclopentane-carboxylic acid methyl ester and 55 ml of pyridine is stirred at room temperature overnight and evaporated. The residue is taken up in water, the mixture extracted with diethyl ether, the extract washed with water and 0.1N hydrochloric acid, dried and evaporated. The residue is taken up in chloroform, the solution chromatographed on 100 g of silica gel and the column eluted with chloroform-ethyl acetate (95:5), to yield the 2α-(6-methoxycarbonyl-hexyl)-3-methylmercaptomethoxyimino-5α-hydroxy-cyclopentane-carboxylic acid methyl ester of the formula

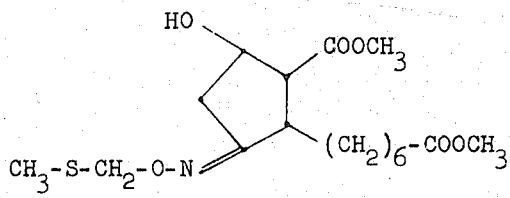

showing in the N.M.R. spectrum peaks at 4.50, 3.74 and 3.65 ppm.

0.64 g thereof are dissolved in 25 ml of methanol and 25 ml of 10 percent aqueous potassium carbonate are added. The mixture is refluxed for 2 hours and concentrated. The concentrate is extracted with diethyl ether, the aqueous layer acidified with N-hydrochloric acid, saturated with sodium chloride and extracted with diethyl ether. The combined extracts are dried, filtered, concentrated and etherealdiazomethane is added until the yellow color persists. The mixture is evaporated, the residue chromatographed on 28 g of silica gel and the column eluted with methylene chloride-ethyl acetate (9:1), to yield the 2β-(6-methoxycarbonylhexyl)-3-methylmercaptomethoxyimino-5β-hydroxy-cyclopentanecarboxylic acid methyl ester of the formula

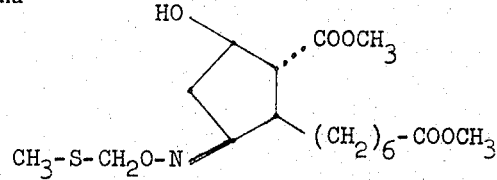

showing in the N.M.R. spectrum peaks at 4.38, 3.75 and 3.68 ppm.

The mixture of 0.765 g thereof, 35 ml of methylene chloride, 0.35 g of dihydropyrane and 25 mg of picric acid is allowed to stand at room temperature overnight and evaporated. The residue is taken up in diethyl ether, the solution washed with 10 percent aqueous potassium bicarbonate and water, dried and evaporated. The residue is chromatographed on silica gel and eluted with ethyl acetate-methylene chloride (1:9), to yield the 2β-(6-methoxycarbonyl-hexyl)-3-methylmercaptomethoxyimino-5β-(2-tetrahydropyranyloxy)-cyclopentane-carboxylic acid methyl ester, of the formula

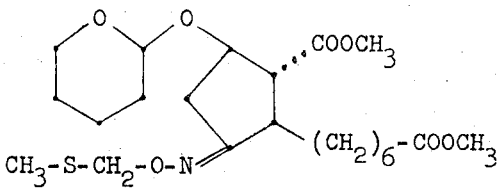

showing in the N.M.R. spectrum peaks at 3.74, 2.24 and 1.55 ppm.

To the solution of 0.9 g thereof in 60 ml of anhydrous ethanol, 1.8 g of sodium borohydride are added portionwise and the mixture is stirred at room temperature for 2 hours. Additional 0.9 g of sodium borohydride are added and the mixture stirred 2 hours longer. It is poured into ice water, the mixture extracted with diethyl ether, the extract dried and evaporated. The residue is chromatographed on silica gel and eluted with ethyl acetatemethylene chloride (3:7), to yield the 7β-[2α-hydroxymethyl-3β-(2-tetrahydropyranyloxy)-5-methylmercaptomethoxyimino-cyclopentyl]-heptanoic acid methyl ester of the formula

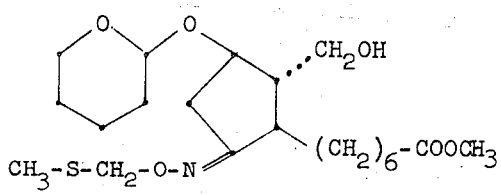

showing in the N.M.R. spectrum peaks at 5.14, 2.22, 1.62 and none at 3.74 ppm.

To the stirred mixture of 0.435 g thereof, 12 ml of dimethylsulfoxide and 12 ml of benzene, 0.128 ml of pyridine, 0.1 ml of trifluoroacetic acid and 1.8 g of 1-cyclohexyl-3-(2-morpholinoethyl)-carbodiimide metho-p-toluene sulfonate are added in this order while stirring at 4°. The mixture is allowed to stand for 24 hours at this temperature and poured into ice water. The mixture is extracted with diethyl ether, the extract washed with water, dried, filtered and evaporated, to yield the 2β-(6-methoxycarbonyl-hexyl)-3-methylmercaptomethoxyimino-5β-(2-tetrahydropyranyloxy)-cyclopentane-carboxaldehyde of the formula

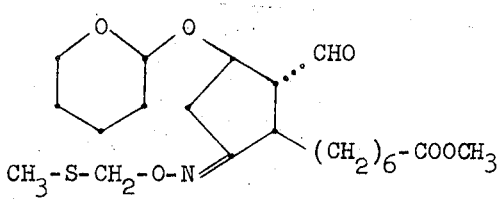

showing in the N.M.R. spectrum peaks at 9.73, 3.67 and 1.38 ppm.

To the solution of 0.337 g thereof in 40 ml of diethyl ether, 0.49 g of tri-n-butyl-phosphoranylidene-2-heptanone are added and the mixture stirred at room temperature overnight. It is evaporated, the residue chromatographed on silica gel and eluted with ethyl acetate-methylene chloride (1:9), to yield the 7β-[2α(3-oxo-1-trans-octenyl)-3β-(2-tetrahydropyranyloxy)-5-methylmercaptomethoxyimino-cyclopentyl]-heptanoic acid methyl ester of the formula

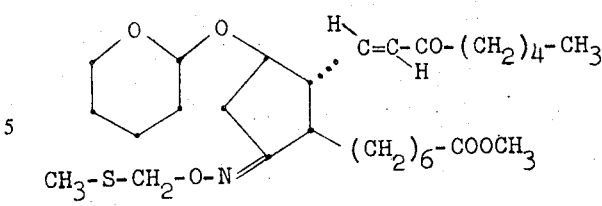

showing in the N.M.R. spectrum peaks at 6.50, 2.24 and 0.90 ppm.

To the solution of 57 mg thereof in 3 ml of 95 percent aqueous ethanol, 0.1 g of sodium borohydride are added, and the mixture is stirred under nitrogen for ½ hour at room temperature. It is diluted with 5 ml of diethyl ether, washed with water and saturated aqueous sodium chloride, dried, filtered and evaporated, to yield the 7β-[2α-(3ξ-hydroxy-1-trans-octenyl)-3β-(2-tetrahydropyranyloxy)-5-methylmercaptomethoxyimino-cyclopentyl]-heptanoic acid methyl ester of the formula

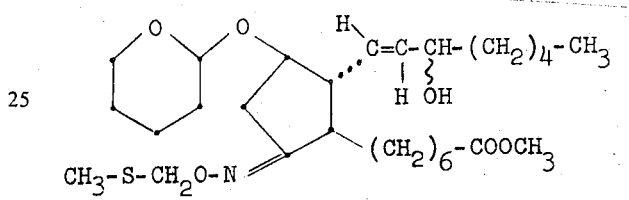

showing in the N.M.R. spectrum peaks at 5.20, 4.64 and 0.90 ppm.

To the solution of 60 mg thereof in 1 ml of methanol, 50 μl of 2N-hydrochloric acid are added and the mixture stirred at room temperature overnight. It is diluted with 100 ml of diethyl ether, washed with water and saturated aqueous sodium chloride, dried, filtered and evaporated. The residue is subjected to preparative thin layer chromatography on silica gel plates (1 mm thick), eluted twice with ethyl acetate-methylene chloride (3:7) and of the two main fractions the slower moving isomer is isolated, to yield the 7β-[2α-(3β-hydroxy-1-trans-octenyl)-3β-hydroxy-5-methylmercaptomethoxyimino-cyclopentyl]-heptanoic acid methyl ester of the formula

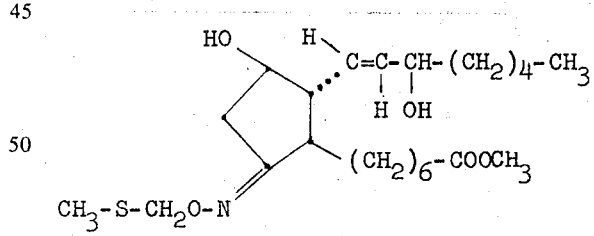

melting at 48°–50°.

To the solution of 82 mg thereof in 5.7 ml of acetic acid, 0.24 g of potassium acetate are added, followed by 0.275 g of mercuric chloride and 0.115 g of mercuric oxide and the mixture is stirred at room temperature for ½ hour. It is diluted with acetone, hydrogen sulfide bubbled through, filtered and the residue washed with acetone. The filtrate is evaporated at room temperature, the residue taken up in water, the mixture extracted with diethyl ether, the extract dried and evaporated, to yield the 7β-[2α-(3β-hydroxy-1-trans-octenyl)-3β-hydroxy-5-acetoxymethoxyimino-cyclopentyl]-heptanoic acid methyl ester, showing in the N.M.R. spectrum peaks at 5.60, 3.67 and 2.10 ppm.

To the solution of 34 mg thereof in 3 ml of methanol, 0.5 ml of 10 percent aqueous potassium carbonate are added and the mixture allowed to stand at room temperature for ½ hour. It is evaporated, the residue taken up in water, the mixture extracted with diethyl ether, the extract dried, evaporated and the residue crystallized from diethyl ether-hexane, to yield the $d,l$-PGE$_1$ methyl ester oxime melting at 105°–107°.

Variously to the solution of 68 mg of 7β-[2α-(3β-hydroxy-1-trans-octenyl)-3β-hydroxy-5-acetoxymethoxyimino-cyclopentyl]-heptanoic acid methyl ester in 6.8 ml of methanol, 1.13 ml of 10 percent aqueous potassium carbonate are added and the solution allowed to stand at room temperature for 4 days. It is evaporated, the residue dissolved in 3.5 ml of glacial acetic acid, and 1.5 ml of 10 percent aqueous sodium nitrite are added at 10° while stirring. After 1 hour, the same amount of sodium nitrite is added and the mixture allowed to reach room temperature within 15 minutes. It is diluted with water, extracted with ethyl acetate-diethyl ether (3:1), the extract washed with saturated aqueous sodium chloride, dried and evaporated at room temperature. The residue is taken up in 0.2 ml of ethyl acetate and the solution allowed to stand overnight at −50°. The precipitate formed is separated and recrystallized from ethyl acetate, to yield $d,l$-PGE$_1$ melting at 112°–115°.

EXAMPLE 2

The mixture of 63.4 g of chloromethyl-phenylsulfide, 81.5 g of N-hydroxyphthalimide, 49.6 g of triethylamine and 830 ml of tetrahydrofuran is refluxed for 15 hours. After cooling, it is filtered and the filtrate evaporated. The residue is taken up in methylene chloride, the mixture washed 5 times with 10 percent aqueous potassium bicarbonate and once with water, dried, evaporated and the residue crystallized from diethyl ether, to yield the N-phenyl-mercaptomethoxyphthalimide, melting at 87°–88.5°.

The mixture of 75 g thereof, 13.5 g of hydrazine hydrate and 600 ml of 95 percent aqueous ethanol is refluxed for 4.5 hours and allowed to slowly cool to room temperature. The precipitate formed is filtered off, the filtrate evaporated and the residue taken up in the minimum amount of diethyl ether. The solution is cooled to 0°, additional precipitate filtered off and the filtrate evaporated. The residue is distilled and the fraction boiling at 84°–87°/0.1 mm Hg collected, to yield the phenylmercaptomethoxyamine of the formula

$$C_6H_5SCH_2ONH_2$$

It is dissolved in the minimum amount of diethyl ether and the solution combined with ethereal hydrogen chloride until no further precipitate is formed. The mixture is filtered and the residue recrystallized from methanol-diethyl ether, to yield the phenylmercaptomethoxyammonium chloride, melting at 110°–112° with decomposition.

The mixture of 2.05 g thereof, 2.3 g of 2α-(6-methoxycarbonyl-hexyl)-3-oxo-5α-hydroxy-cyclopentane-carboxylic acid methyl ester and 63 ml of pyridine is stirred at room temperature overnight and evaporated at room temperature. The residue is taken up in water, the mixture extracted with diethyl ether, the extract washed with water, 0.2 N hydrochloric acid and water, dried, evaporated and the residue crystallized from diethyl ether-hexane, to yield the 2α-(6-methoxycarbonyl-hexyl)-3-phenylmercaptomethoxyimino-5α-hydroxy-cyclopentane-carboxylic acid methyl ester melting at 53°–55°.

7.0 g thereof are added to the solution obtained from 250 ml of methanol and 0.105 g of sodium and the mixture is refluxed overnight under nitrogen. It is evaporated, the residue taken up in water, the mixture extracted with diethyl ether, the extract washed with water and saturated aqueous sodium chloride, dried, filtered and evaporated. The residue is chromatographed on 400 g of silica gel and the column eluted with ethyl acetate-methylene chloride (5:95), to yield the 2β-(6-methoxycarbonylhexyl)-3-phenylmercaptomethoxyimino-5β-hydroxy-cyclopentanecarboxylic acid methyl ester, showing in the N.M.R. spectrum peaks at 7.7–7.0, 5.45 and 4.35 ppm.

The mixture of 3.2 g thereof, 210 ml of methylene chloride, 2.1 ml of dihydropyrane and 210 mg of picric acid is allowed to stand at room temperature overnight and evaporated. The residue is taken up in diethyl ether, the solution washed 4 times with 10 percent aqueous potassium bicarbonate and once with water, dried and evaporated. The residue is chromatographed on 120 g of silica gel and eluted with ethyl acetate-methylene chloride (1:9), to yield the 2β-(6-methoxycarbonyl-hexyl)-3-phenylmercaptomethoxyimino-5β-(2-tetrahydropyranyloxy)-cyclopentane-carboxylic acid methyl ester, showing in the N.M.R. spectrum peaks at 3.72, 3.66 and 1.62 ppm.

To the solution of 3.7 g thereof in 200 ml of ethanol, 4.0 g of sodium borohydride are added at once and the mixture is stirred at room temperature for one hour. Additional 1.0 g of sodium borohydride are added and the mixture stirred 3 hours longer. It is evaporated, the residue taken up in water, the mixture extracted with diethyl ether, the extract washed with cold water, dried and evaporated. The residue is chromatographed on silica gel and eluted with ethyl acetate-methylene chloride (3:7), to yield the 7β-[2α-hydroxymethyl-3β-(2-tetrahydropyranyloxy)-5-phenylmercaptomethoxyimino-cyclopentyl]-heptanoic acid methyl ester, showing in the N.M.R. spectrum peaks at 3.67, 2.30, 1.35 and none at 3.72 ppm.

To the solution of 52 mg thereof in 5 ml of methylene chloride, 165 mg of pyridine-chromium trioxide complex in 5 ml of methylene chloride are added at once and the mixture stirred at room temperature for 10 minutes. It is washed with water twice, dried, treated with charcoal, filtered and evaporated, to yield the 2β-(6-methoxycarbonyl-hexyl)-3-phenylmercaptomethoxyimino-5β-(2-tetrahydropyranyloxy)-cyclopentane-carboxaldehyde, showing in the N.M.R. spectrum peaks at 9.75, 5.40 and 3.61 ppm.

To the solution of 0.405 g thereof in 20 ml of diethyl ether, 0.41 g of tri-n-butyl-phosphoranylidene-2-heptanone are added and the mixture stirred at room temperature overnight. It is evaporated, the residue chromatographed on silica gel and eluted with ethyl acetate-methylene chloride (1:9), to yield the 7β-[2α-(3-oxo-1-trans-octenyl)-3β-(2-tetrahydropyranyloxy)-5-phenylmercaptomethoxyimino-cyclopentyl]-heptanoic acid methyl ester, showing in the N.M.R. spectrum peaks at 9.75, 4.50 and 0.90 ppm.

To the solution of 0.425 g thereof in 40 ml of ethanol, 0.45 g of sodium borohydride are added during 5 minutes and the mixture is stirred under nitrogen for ½ hour at room temperature. It is poured into ice water, extracted with diethyl ether, the extract washed with water and saturated aqeuous sodium chloride, dried, filtered and evaporated, to yield the 7β-[2α-(3ξ-hydroxy-1-trans-octenyl)-3β-(2-tetrahydropyranyloxy)-5-phenylmercaptomethoxy-imino-cyclopentyl]-heptanoic acid methyl ester showing in the N.M.R. spectrum peaks at 5.60, 1.64 and 0.90 ppm.

To the solution of 0.425 g thereof in 50 ml of methanol, 0.2 ml of 1N hydrochloric acid are added and the mixture allowed to stand at room temperature overnight. It is evaporated, the residue subjected to preparative thin layer chromatography on silica gel plates (1 mm thick), eluted twice with ethyl acetate-methylene chloride (3:7) and of the two main fractions the slower moving isomer is isolated, to yield the 7β-[2α-(3β-hydroxy-1-trans-octenyl)-3β-hydroxy-5-phenymercaptomethoxyimino-cyclopentyl]-heptanoic acid methyl ester, melting at 52°–54° after recrystallization from diethyl ether-hexane.

To the solution of 85 mg thereof in 5.7 ml of acetic acid, 238 mg of potassium acetate are added, followed by 272 ml of mercuric chloride and 113 mg of mercuric oxide and the mixture is stirred at room temperature for ½ hour. It is diluted with acetone, hydrogen sulfide is bubbled through, filtered and the residue washed with acetone. The filtrate is evaporated at room temperature, the residue taken up in water, the mixture extracted with diethyl ether, the extract dried and evaporated, to yield the 7β-[2α-(3β-hydroxy-1-trans-octenyl)-3β-hydroxy-5-acetoxymethoxy-imino-cyclopentyl]-heptanoic acid methyl ester, which is identical with that obtained according to Example 1.

The starting material is prepared as follows: To the solution of 6.09 g of 2α-(6-methoxycarbonyl-hexyl)-3-oxo-5α-trimethylsiloxy-cyclopentane-carboxylic acid methyl ester in 250 ml of methanol, 1 ml of formic acid is added and the mixture allowed to stand at room temperature overnight. It is evaporated and the residue crystallized from diethyl ether, to yield the 2α-(6-methoxycarbonyl-hexyl)-3-oxo-5α-hydroxy-cyclopentane-carboxylic acid methyl ester, melting at 68°–70°.

EXAMPLE 3

Through the mixture of 55.09 g of thiophenol and 44 g of acetaldehyde, anhydrous hydrogen chloride is bubbled for 3 hours at −15°, 5 g of calcium chloride are added and the mixture is allowed to stand at 0° for 2 hours. It is filtered, the residue washed with methylene chloride and the filtrate evaporated at room temperature, to yield the 1-chloroethyl-phenylsulfide.

To the mixture of 86 g thereof, 97.8 g of N-hydroxyphthalimide and 400 ml of tetrahydrofuran, the solution of 58.6 g of triethylamine in 100 ml of tetrahydrofuran is added dropwise and the mixture refluxed for 15 hours. It is filtered cold, the filtration concentrated, the concentrate diluted with methylene chloride and the mixture washed 6 times with 10 percent aqueous potassium bicarbonate, dried, evaporated and the residue crystallized from diethyl ether, to yield the N-(1-phenylmercaptoethoxy)-phthalimide, melting at 63°–67°.

The mixture of 20 g thereof, 2.24 g of hydrazine hydrate, 2.2 ml of water and 200 ml of 95 percent aqueous ethanol is refluxed for 4 hours and allowed to cool to room temperature. It is filtered, the filtrate evaporated and the residue taken up in the minimum amount of diethyl ether. The solution is allowed to stand at 0° overnight, filtered, the filtrate evaporated, the residue distilled and the fraction boiling at 74°–76°/0.1 mm Hg collected, to yield the 1-phenylmercaptoethoxyamine of the formula

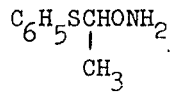

In the analogous manner, the following compounds of Formula VI are prepared from equivalent amounts of the corresponding starting materials:

| No. | R₁ | R₂ | R₃ | b.p./0.1 mm Hg | m.p. phthalimide |
| --- | --- | --- | --- | --- | --- |
| 1 | benzyl | H | H | 86–89° | 102–103° |
| 2 | do. | CH₃ | H | 100° | 72–74° |
| 3 | α-phenethyl | H | H | 110° | 117–119° |

Instead of using monomeric aldehydes, also polymers thereof can be applied, e.g., paraformaldehyde.

EXAMPLE 4

To the solution of 0.405 g of 2β-(6-methoxycarbonylhexyl)-3-phenylmercaptomethoxyimino-5β-(2-tetrahydropyranyloxy)-cyclopentane-carboxaldehyde in 20 ml of diethyl ether, 0.365 g of tri-n-butyl-phosphoranylidene-3,3-dimethyl-2-butanone are added and the mixture stirred at room temperature overnight. It is evaporated, the residue chromatographed on silica gel and eluted with ethyl acetate-methylene chloride (1:9), to yield the 7β-[2α-(3-oxo-4,4-dimethyl-1-trans-pentenyl)-3β-(2-tetrahydropyranyloxy)-5-phenylmercaptomethoxyimino-cyclopentyl]-heptanoic acid methyl ester of the formula

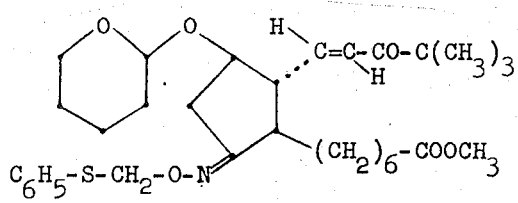

showing in the N.M.R. spectrum peaks at 7.7–6.5, 5.45 and 3.65 ppm.

To the solution of 365 mg thereof in 35 ml of ethanol, 0.4 g of sodium borohydride are added during 5 minutes and the mixture is stirred for ½ hour at room temperature. It is poured into water, extracted with diethyl ether, the extract washed with water and saturated aqueous sodium chloride, dried, filtered and evaporated, to yield the 7β-[2α-(3ξ-hydroxy-4,4-dimethyl-1-transpentenyl)-3β-(2-tetrahydropyranyloxy)-5-phenylmercaptomethoxyiminocyclopentyl]-heptanoic acid methyl ester of the formula

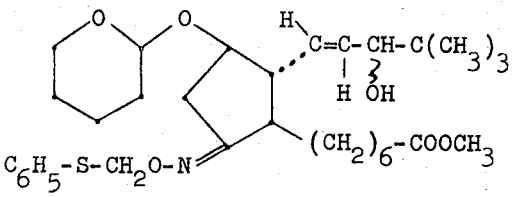

showing in the N.M.R. spectrum peaks at 5.60, 2.20 and 1.60 ppm.

To the solution of 350 mg thereof in 40 ml of methanol, 0.15 ml of 0.1 N-hydrochloric acid are added and the mixture stirred at room temperature overnight. It is evaporated, the residue subjected to preparative thin layer chromatography on silica gel plates (1 mm thick), eluted with ehtyl acetate-methanol (1:1) and of the two main fractions the slower moving isomer is isolated, to yield the 7β-[2α-(3β-hydroxy-4,4-dimethyl-1-trans-pentenyl)-3β-hydroxy-5-phenylmercaptomethoxyimino-cyclopentyl]-heptanoic acid methyl ester of the formula

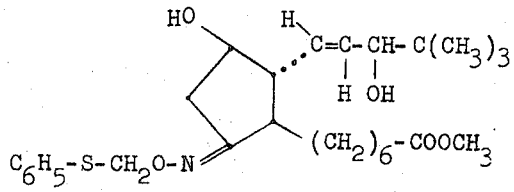

showing in the N.M.R. spectrum peaks at 7.70–7.00, 5.60 and 3.65 ppm.

To the solution of 125 mg thereof in 8.4 ml of acetic acid, 355 mg of potassium acetate are added, followed by 405 mg of mercuric chloride and 355 mg of mercuric oxide and the mixture is stirred at room temperature for ½ hour. It is diluted with acetone, hydrogen sulfide bubbled through, filtered and the residue washed with acetone. The filtrate is evaporated at room temperature, the residue taken up in water, the mixture extracted with diethyl ether, the extract dried and evaporated, to yield the 7β-[2α-(3β-hydroxy-4,4-dimethyl-1-trans-pentenyl)-3β-hydroxy-5-acetoxymethoxyiminocyclopentyl]-heptanoic acid methyl ester, which is used as such without further purification.

To the solution of 95 mg thereof in 9.5 ml of methanol, 1.58 ml of 10 percent aqueous potassium carbonate are added and the solution allowed to stand at room temperature for 4 days. It is evaporated, the residue dissolved in 5 ml of glacial acetic acid, and 2 ml of 10 percent aqueous sodium nitrite are added at 10° while stirring. After 1 hour, the same amount of sodium nitrite is added and the mixture allowed to reach room temperature within 15 minutes. It is diluted with water, extracted with ethyl acetate-diethyl ether (3:1), the extract washed with saturated aqueous sodium chloride, dried and evaporated at room temperature. The residue is subjected to preparative thin layer chromatography on silica gel plates (1 mm thick), eluted with benzene-dioxane-acetic acid (5:5:0.25) and the main fraction with Rf = 0.57 isolated, to yield the 7β-[2α-(3β-hydroxy-4,4-dimethyl-1-trans-pentenyl)-3β-hydroxy-5-oxo-cyclopentyl]-heptanoic acid of the formula

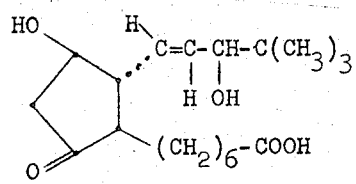

EXAMPLE 5

To the solution of 0.2 g of 2β-(6-methoxycarbonyl-hexyl)-3-phenylmercaptomethoxyimino-5β-(2-tetrahydropyranyloxy(-cyclopentane-carboxaldehyde in 12 ml of diethyl ether, 0.3 g of tri-n-butyl-phosphoranylidene-4-ethoxy-2-butanone are added and the mixture stirred at room temperature overnight. It is evaporated under reduced pressure, the residue subjected to preparative thinlayer chromatography on silica gel and eluted with ethyl acetatemethylene chloride (1:9) and the UV-active portion with Rf = 0.60 eluated with methanol-ethyl acetate (1:1), to yield the 7β-[2α-(3-oxo-5-ethoxy-1-trans-pentenyl)-3β-2-tetrahydropyranyloxy-5-phenylmercaptomethoxyimino-cyclopentyl]-heptanoic acid methyl ester of the formula

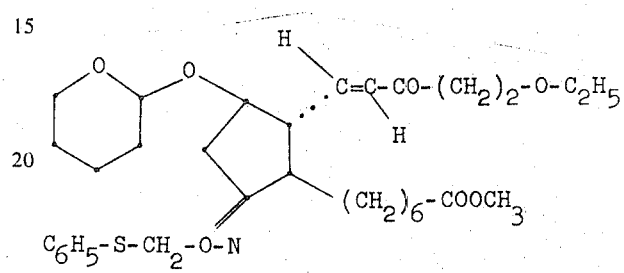

showing in the N.M.R. spectrum peaks at 7.25, 5.40, 3.60 and 1.24 ppm.

To the solution of 0.21 g thereof in 15 ml of ethanol, 0.225 g of sodium borohydride are added in five portions during five minutes and the mixture stirred for a half hour at room temperature. It is poured into ice water, extracted with diethyl ether, the extract dried and evaporated under reduced pressure. The residue is taken up in 30 ml of methanol, 1 ml of 0.1 N hydrochloric acid are added and the mixture stirred at room temperature for 15 hours. It is evaporated under reduced pressure, the residue taken up in diethyl ether, the solution washed with water, dried and evaporated. The residue is subjected to preparative thin-layer chromatography on silica gel, developed three times with methylene chloride-ethyl acetate (7:3) and the polar fraction with Rf = 0.30 eluted with ethyl acetate-methanol (1:1), to yield the 7β-[2α-(3β-hydroxy-5-ethoxy-1-trans-pentenyl)-3β-hydroxy-5-phenylmercaptomethoxyimino-cyclopentyl]-heptanoic acid methyl ester of the formula

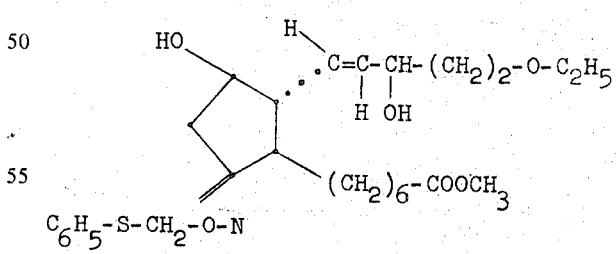

showing in the N.M.R. spectrum peaks at 7.30, 5.30, 3.66 and 2.50 ppm.

The less polar fraction with Rf = 0.50 yields the C-15-epi-analog thereof showing in the N.M.R. spectrum peaks at 7.30, 5.60, 5.45 and 4.15 ppm.

125 mg of both epimers are processed in the analogous manner as shown in Example 4, to yield the 7β-[2α-(3β-hydroxy-5-ethoxy-1-trans-pentenyl)-3β- hydroxy-5-oxo-cyclopentyl]-heptanoic acid of the formula

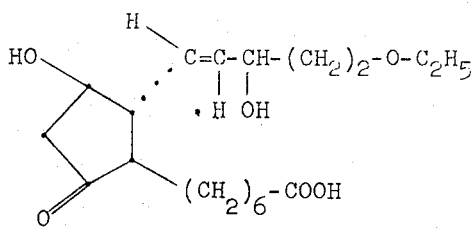

showing in the N.M.R. spectrum peaks at 5.60, 2.25 and 1.16 ppm, as well as the C-15-epimer thereof.

EXAMPLE 6

Injectable solution containing 1 mg/ml of the active ingredient:
Formula:

| | |
|---|---|
| 7β-[2α-(3β-hydroxy-5-ethoxy-1-trans-pentenyl)-3β-hydroxy-5-oxo-cyclopentyl]-heptanoic acid | 17 G |
| Methylcellulose | 178 g |
| Sodium carboxymethylcellulose | 51 g |
| Polysorbate | 85 g |
| Chlorobutanol | 85 g |
| 0.2M Sodium phosphate buffer pH = 8 | q.s. |
| Water for injection | q.s. |

Procedure:

All the solid ingredients, except the drug substance, are dissolved in 13 lt of water at 90° until dissolved and the solution is allowed to cool to room temperature. Then the drug substance is added while stirring for 30 minutes, followed by the necessary amount of the buffer solution, to obtain a pH of 7.4. The solution is made up to 17 lt with water, sterile filtered and 2 ml aliquots thereof are filled aseptically into sterile ampoules, which are flame sealed.

We claim:

1. The new ketone of the formula

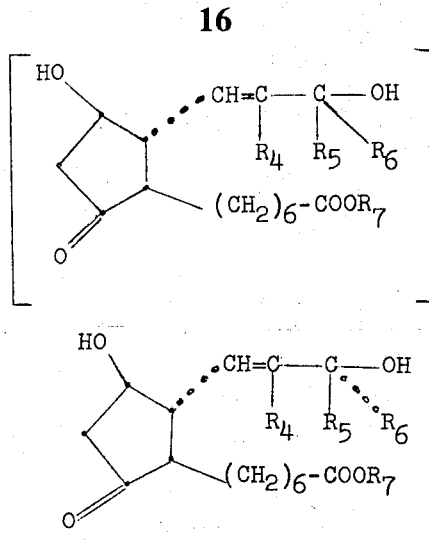

in which each of $R_4$ and $R_5$ are hydrogen or lower alkyl, $R_6$ is mono-lower alkoxy-lower alkyl and $R_7$ is hydrogen, an alkali metal atom or one equivalent of an alkaline earth metal, lower alkyl, lower alkenyl, lower alkynyl, 3 to 7 ring-membered cycloalkyl, cycloalkenyl, (cycloalkyl or cycloalkenyl)-lower alkyl or $Ph-C_nH_{2n}$, wherein Ph is phenyl, (lower alkyl)-phenyl, (lower alkoxy)-phenyl, (lower alkylenedioxy)-phenyl, (halogeno)-phenyl, (trifluoromethyl)-phenyl, (nitro)-phenyl or (di-lower alkylamino)-phenyl, and n is an integer from 0 to 4, in which definitions the term "lower" defines the respective organic radicals with up to 4 carbon atoms.

2. A compound as claimed in claim 1, in which formula each of $R_4$ and $R_5$ are hydrogen or alkyl, $R_6$ is alkoxyalkyl and $R_7$ is hydrogen, sodium, potassium or alkyl, wherein alkyl or alkoxy contains up to 4 carbon atoms.

3. A compound as claimed in claim 1, in which formula each of $R_4$ and $R_5$ are hydrogen or methyl, $R_6$ is 2-ethoxyethyl and $R_7$ is hydrogen, sodium, potassium or alkyl with up to 4 carbon atoms.

* * * * *